Jan. 20, 1942.   H. W. PILCHER ET AL   2,270,471
AUGER CONVEYER FOR HARVESTER PLATFORMS
Original Filed March 1, 1940   3 Sheets-Sheet 1

INVENTOR:
HAROLD W. PILCHER
ALVIN W. OEHLER
BY
ATTORNEYS.

Jan. 20, 1942. H. W. PILCHER ET AL 2,270,471
AUGER CONVEYER FOR HARVESTER PLATFORMS
Original Filed March 1, 1940 3 Sheets-Sheet 2

INVENTOR:
HAROLD W. PILCHER
ALVIN W. OEHLER
BY
ATTORNEYS.

Jan. 20, 1942.   H. W. PILCHER ET AL   2,270,471
AUGER CONVEYER FOR HARVESTER PLATFORMS
Original Filed March 1, 1940    3 Sheets—Sheet 3

INVENTOR:
HAROLD W. PILCHER
ALVIN W. OEHLER
BY
ATTORNEYS.

Patented Jan. 20, 1942

2,270,471

UNITED STATES PATENT OFFICE 2,270,471

AUGER CONVEYER FOR HARVESTER PLATFORMS

Harold W. Pilcher, Rock Island, and Alvin W. Oehler, Moline, Ill., assignors to Deere & Company, Moline, Ill., a corporation of Illinois Original application March 1, 1940, Serial No. 321,678. Divided and this application August 17, 1940, Serial No. 353,078

5 Claims. (Cl. 198—213)

The present invention relates to auger conveyers for harvester platforms and is a division of an application Serial No. 321,678 filed March 1, 1940 by Pilcher, Oehler, and Paradise.

The principal object of this invention relates to the provision of a novel and improved auger tube conveyer for a harvester platform, which facilitates assembly and disassembly and which can be operated efficiently under widely varying crop conditions, to convey the crop with a minimum loss of grain and with a minimum of clogging or slugging.

For transport purposes it is necessary in a machine of this type to reduce the width of the platform to accommodate the machine to narrow roads and gates. To accomplish this purpose, we found it preferable to remove the auger in one unitary piece, after which the outer end of the platform can be dismounted. The auger is supported on a shaft which extends across the platform and is supported in a pair of journal bearings at opposite ends thereof carried in the end walls of the platform, respectively, the drive gears and overload release clutch mechanism being mounted on the auger shaft outside of one of the end walls. To facilitate the assembly and disassembly of the auger, it is one of the specific objects of our invention to provide a bearing mounting, which will permit removing the auger without necessity of disassembling and removing the draft gear and slip clutch from the auger shaft.

In the accomplishment of this object, the end wall of the platform is provided with an opening large enough to permit the shaft with the driving mechanism mounted thereon to be inserted therethrough. The shaft bearing is attached to a plate, which can then be rigidly secured to the wall in a position to completely cover the opening.

It is customary to provide a baffle disposed horizontally along the back wall of the platform and extending forwardly over the upper portion of the auger conveyer for the purpose of assisting the conveyer in moving the harvested material along the platform trough and preventing the material from winding around the auger. It is desirable that the forward edge of the baffle extend to a position closely adjacent the upper end of the auger conveyer in order to act as a stripper in preventing harvested material from being thrown forwardly over the auger under normal conditions. We have found however that in certain crop conditions in which there is an abundance of heavy weeds mixed with the grain it is desirable to increase the clearance between the stripper edge of the baffle and the auger in order to decrease the possibility of the heavy weeds becoming clogged between the auger and the stripper edge. It is therefore a still further specific object of our invention to provide means for adjusting the clearance between the stripper edge of the baffle and the edge of the blades of the auger.

These and other objects and advantages of the present invention will be apparent after a consideration of the following description, in which reference is had to the drawings appended hereto, in which Figure 1 is a perspective view of a harvester platform embodying the principles of our invention showing the general arrangement of parts thereof;

Figure 5:
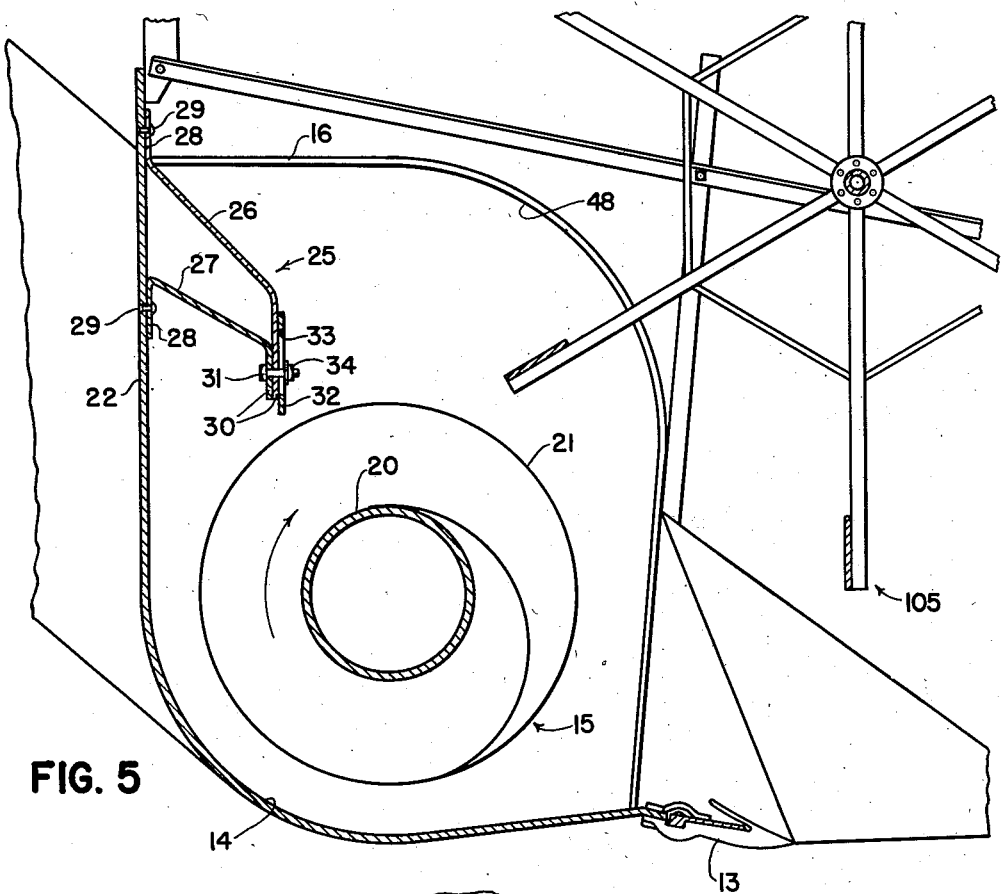
Figure 4:
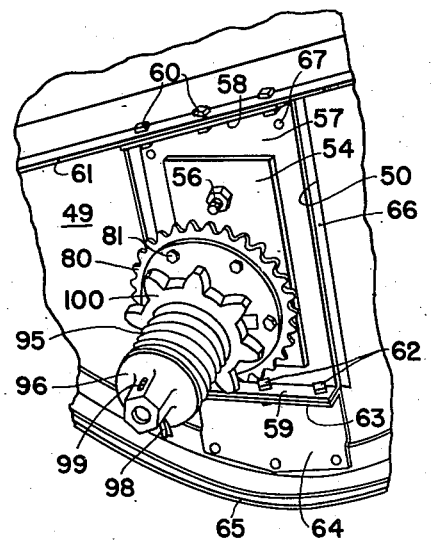

Figure 4 is a perspective view of the mounting for the bearing on the driving end of the auger conveyer, showing the method of supporting the bearing in the end wall of the harvester platform with the slip clutch and driving gear means on the outer end of the shaft; and Figure 5 is a sectional view taken along a vertical fore-and-aft-extending plane through the harvester platform, showing the details of construction of the adjustable baffle over the auger conveyer.

Referring now to the drawings, the harvesting unit 11 comprises a transversely extending platform 12 including a conventional cutter bar 13 behind which is disposed a transversely extending conveyer trough 14. An auger conveyer 15 is mounted in the platform trough 14 for rotation about an axis generally transverse with respect to the travel of the implement and is supported by bearing means which will be described more particularly. The auger 15 conveys the harvested material laterally from behind the cutter bar to a feeder house 16 which extends rearwardly from the stubbleward end of the platform 12 and is rigid with respect thereto.

The auger conveyer 15 comprises a hollow shaft 20 of a substantial diameter to prevent wrapping of the stalks thereabout and supported on the hollow shaft 20 is a helically wound auger blade 21, which is wound in such a direction that the harvested material is moved toward the feeder house 16 when the auger is turned in a clockwise direction as viewed from the grainward side as in Figure 5. The auger is disposed in the platform trough 14, which is preferably curved about the axis of rotation of the auger 15. The trough is continued upwardly at the rear of the auger to form a back wall 22, which extends along the entire length of the platform. As is customary in a platform having an auger conveyer, the horizontal baffle, indicated in its entirety by reference numeral 25, is mounted on the back wall 22 and extends along the length thereof and projects forwardly over the upper side of the auger 15. The baffle 25 comprises a pair of upper and lower sheet metal strips 26, 27 respectively, having rear flanges 28 serving to support the strips on the back wall 22 by means of rivets 29. The strips 26, 27 converge downwardly and forwardly from the back wall and have a pair of downwardly turned outer flanges 30, which fit closely together and are joined by means of a series of bolts 31. The lower edges of the flanges 30 terminate above the upper portion of the auger 15 and are vertically spaced from the edges of the helical blade 21 of the auger.

Although it is customary to provide such a baffle for the purpose of engaging any stalks that tend to pass over the top of the auger by virtue of the rotation of the latter and thus cause the stalks to be moved laterally along the back wall 22 toward the feeder house 16, we have discovered that the efficiency of the baffle can be greatly increased by providing a means for adjusting the clearance between the stripper edge along the forward edge of the baffle and the auger conveyer blades 21. Heretofore it has been customary to provide non-adjustable baffles with sufficient clearance over the auger to prevent heavy weed stalks from clogging the gap between the baffle and the auger blades, but when operating in other conditions where the crops are clean and with few weeds, the auger does not operate at its maximum efficiency due to the clearance being more than necessary. Accordingly, we have provided an adjustable stripper edge in the form of an adjustable edge plate 32, which lies in juxtaposition with the downwardly turned flanges 30 of the baffle strips 26, 27 and extends along the entire length of the baffle 25. The plate 32 is provided with vertically extending slots 33, through which the bolts 31 are inserted. The slots 33 permit vertical adjustment of the plate 32 relative to the bolts 31 to increase or decrease the clearance between the lower edge of the stripper plate 32 and the blade 21 of the auger 15. The plate 32 is rigidly fixed to the baffle strips 26, 27 by tightening the nuts 34 on the bolts 31.

Figure 2:
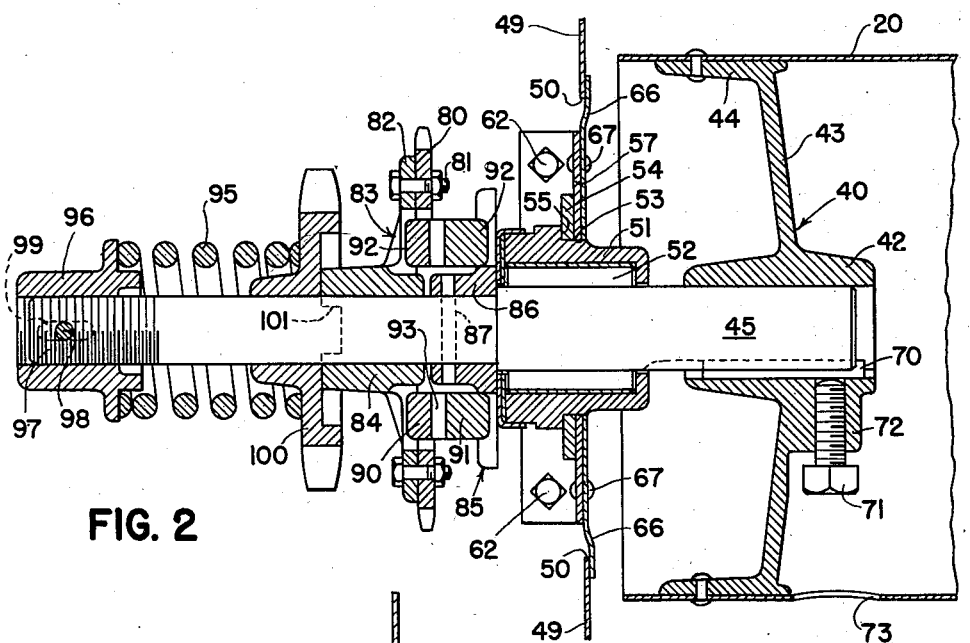
Figure 2 is a sectional view taken along a horizontal plane passing through the axis of the conveyer shaft and supporting bearing at the driving end of the shaft and drawn to an enlarged scale.

Each end of the hollow shaft 20 of the auger 15 is supported on a spider 40, 41, respectively. (See Figures 2 and 3.) Each of the spiders comprises a casting having a hub portion 42 carrying a radial web portion 43, which carries at its outer edge an axially extending flange 44 for supporting the hollow shaft 20. The hubs 42 are each supported on a stub shaft 45, 46, respectively. The stubbleward end of the conveyer 15 extends into the feeder house 16, which has an opening 48 in its grainward side to receive the auger. The stubbleward wall 49 of the lower portion of the feeder house 16 is provided with an aperture 50, through which the stub shaft 45 extends beyond the wall 49. The shaft 45 is journaled in a bearing hub 51 provided with suitable antifriction rollers 52, and the hub 51 has a cylindrical portion 53 that is accurately machined to fit snugly within a cooperative aperture in a plate 54, which sets against a shoulder 55 on the hub. The plate 54 is rigidly fixed by means of bolts 56 to a supporting plate 57 having outwardly turned upper and lower flanges 58, 59, respectively. The upper flange 58 is rigidly but detachably fixed by means of bolts 60 to the outwardly extending flange of a structural frame member 61 extending generally fore and aft along the side of the wall 49 of the feeder housing 16. Similarly, the lower flange 59 is rigidly but detachably connected by bolts 62 to the outwardly turned flange 63 of a bracket 64 which is secured to the lower frame member 65 in the feeder house. Thus, the supporting plate 57 is supported by means of the bolts 60 directly within the opening 50 in the wall 49 of the feeder house. The opening 50 is tightly sealed by means of a sealing plate 66, which is apertured to receive the hub 51 and is fixed to the supporting plate 57 by rivets 67 and thus bears firmly against the inside of the feeder house wall 49 to prevent loss of harvested material through the opening 50.

The stub shaft 45 is secured within the hub 42 of the spider 40 by means of a key 70 disposed in suitable aligned grooves in the hub 42 and stub shaft 45 and held in place by means of a setscrew 71, which is threaded into a boss 72 in the hub. The setscrew 71 can be tightened or loosened by inserting a suitable socket wrench through an opening 73 in the hollow shaft 20 in alignment with the setscrew 71. Thus, it is evident that the stub shaft 45 is disposed in driving relation to the hub 42 and the stub shaft 45 is driven by means outside the feeder house wall 49 as will now be described.

The stub shaft 45 is driven by a chain 75 extending from a drive sprocket 76 rotatably mounted on the side wall 49 of the feeder house and connected to a sprocket 77, which is in turn driven by a chain connection 78 from any suitable source of power on the implement. The drive chain 75 is trained over sprocket 80, which is secured by means of bolts 81 to one member 82 of a slip clutch or overload release clutch indicated in its entirety by reference numeral 83. The clutch member 82 has a hub 84, which is rotatably journaled on the shaft 45 and is also slidable axially on the latter. The other member 85 of the slip clutch 83 has a hub 86, which is rigidly fixed to the stub shaft 45 by means of a pin 87 extending through aligned apertures in the shaft 45 and member 85. The two clutch members 82, 85 are provided with a pair of intermeshing annular jaw collars 90, 91, respectively, each of said jaw collars being provided with axially extending lugs 92 which fit into corresponding recesses in the respective clutch members 82, 85 and thereby holding the jaw collars in driving relation with the respective clutch members. The jaw collars 90, 91 are provided with intermeshing hard clutch jaws 93, which are of such a shape as to cause a component of the driving force to tend to separate the two clutch members by urging the driven member 82 outwardly axially along the shaft 45, in well-known manner. This axial movement of the clutch member 82 is resisted by means of a strong compression coil spring 95, which encircles the outer end of the stub shaft 45 and bears against an adjusting nut 96, which is threaded on the outer end of the stub shaft 45, the latter being correspondingly threaded as indicated at 97. The adjusting nut 96 is secured in adjusted position by means of a pin 98, which is adapted to be inserted through an elongated opening in the adjusting nut 96, which can be aligned with a suitable aperture 99 in the shaft 45 to receive the pin 98. The spring 95 bears against the sprocket 100, which is slidably disposed on the shaft 45 and has driving jaws 101, which interengage with corresponding jaws on the hub 84 of the clutch member 82. Thus, the force of the spring 95 is transmitted through the sprocket 100 against the movable clutch member 82.

Figure 1:
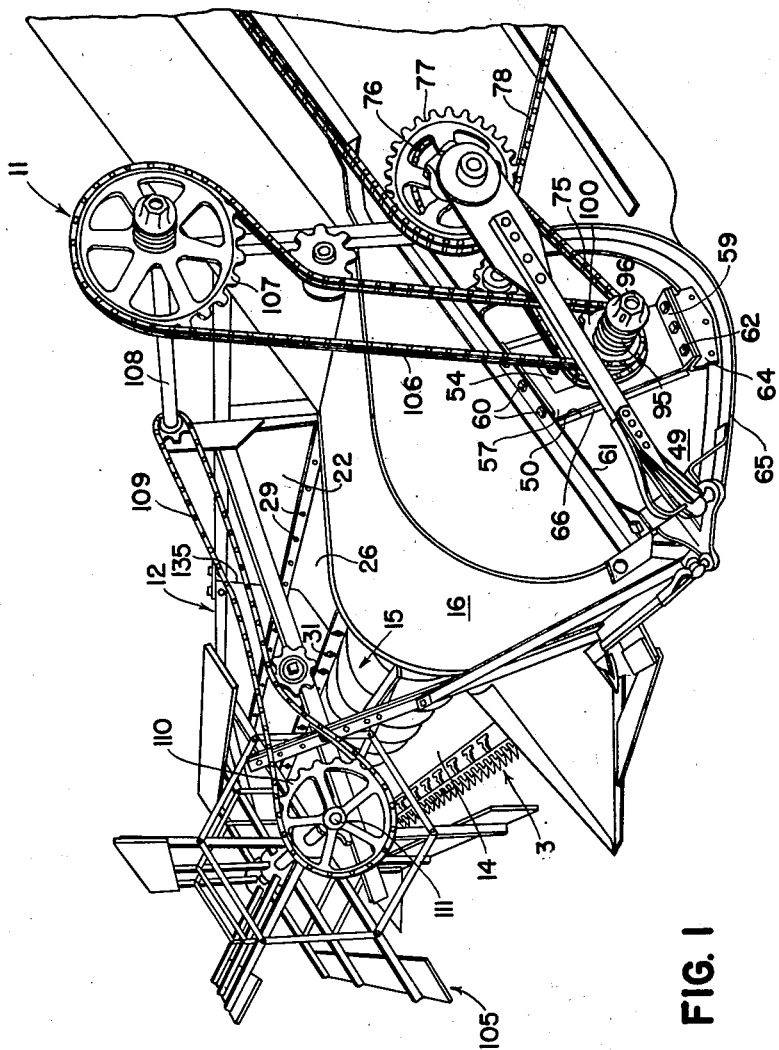

The purpose of the sprocket 100 is for driving the harvester reel 105 (see Figure 1) by means of a chain 106, which drives the sprocket 107 fixed to a countershaft 108 journaled above the feeder house 16 and which in turn is connected by another chain 109 to a sprocket 110 on the shaft 111 of the reel 105.

Figure 3:
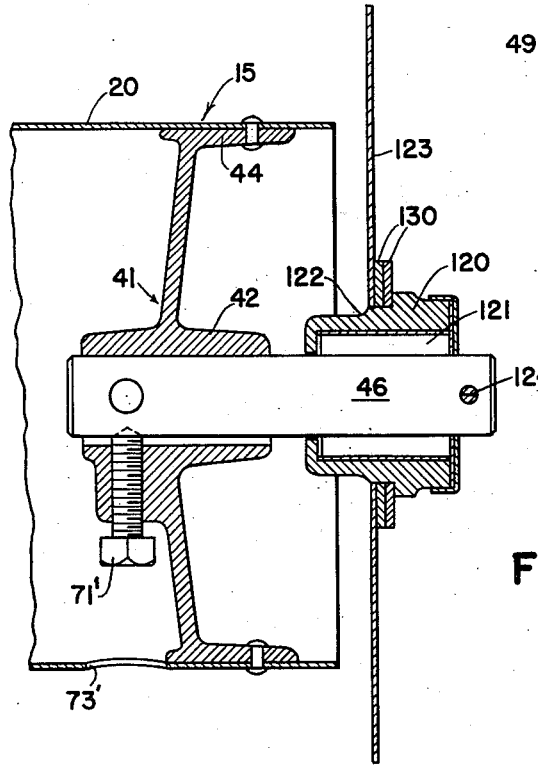
Figure 3 is a sectional plan view similar to Figure 2 but showing the bearing mounting at the opposite end of the auger conveyer shaft.

Referring now more particularly to Figure 3, the stub shaft 46 at the opposite end of the auger 15 is fixed in the spider hub 42 by means of a setscrew 71' which is adjustable through an opening 73' in the hollow shaft 20. The outer end of the stub shaft 46 is supported in a bearing hub 120, containing suitable anti-friction rollers 121. The hub 120 fits into an opening 122 in the end wall 123 at the grainward end of the platform and is suitably secured therein by means of a cotter pin 124 inserted through an opening in the end of the stub shaft 46 outside of the bearing hub 120. One or more spacing washers 130 are inserted between the end wall 123 and a shoulder 131 on the bearing hub to prevent too much end play of the latter on the stub shaft.

To prepare the implement for transport, the width of the machine must be reduced in order to permit it to pass through narrow gates and along narrow roads. The reel and sickle are first removed from the platform and the details of these operations form no part of the present invention. The cotter pin 124 is then withdrawn from the end of stub shaft 46 and the bearing hub 120 and washers 130 are removed from the end wall 123. The platform 12 is then separated at its line of division, indicated at 135 in Figure 1, by removing certain bolts, the details of which form no part of the present invention. The outer half of the platform is then removed, after which the auger bearing supporting plate 57 is disconnected from the feeder house wall 49 by removing the bolts 60, 62. The entire auger 15 can then be slid out of the feeder house without dismantling the stubbleward bearings 51 or without removing the sprockets or the slip clutch from the stub shaft 45. The supporting plate 57 and the entire driving mechanism, including sprockets and slip clutch, merely pass through the opening 50, which is large enough to accommodate the removal of these parts therethrough. This is a great convenience over the conventional method of disassembly, which necessitates dismantling the driving mechanism, and thus not only saves time but eliminates the danger of losing some of the many small parts which are assembled in the driving mechanism.

Obviously, the assembly of the combine is merely the converse of the above-mentioned procedure. The stubbleward end of the auger is secured in place once more merely by replacing the bolts 60, 62.

We claim:
1. In a harvesting machine, a header platform having an end wall, a conveyer including a shaft extending across said platform and beyond said end wall, driving gear means mounted on said shaft outside of said end wall, the latter being apertured to receive said shaft, a bearing in which said shaft is journaled, a plate for supporting said bearing, the aperture being of sufficient size to permit the passage therethrough of the shaft with said gear, bearing, and plate thereon during assembly and disassembly, and means outside said end walls for securing said plate in said aperture.

2. In a harvester machine, a transverse header platform having a vertically disposed fore-and-aft-extending end wall, a conveyer including a transversely disposed shaft extending across said platform and beyond said wall, driving gear means mounted on said shaft outside of said end wall, the latter having an aperture of sufficient size to permit the passage therethrough of the shaft with said driving gear means thereon during assembly and disassembly, a bearing in which said shaft is journaled, a support for said bearing including a plate inside said end wall and overlapping the aperture to close the latter, and means passable through said aperture for securing said bearing support to said end wall to position said bearing in said aperture.

3. In a harvesting machine, a header platform, a feeder housing attached at one end thereof, said housing being open on the side adjacent the platform and having a wall on the outer side thereof, an auger conveyer extending across the platform and including a supporting shaft extending through said feeder house and beyond said outer side wall, the latter being provided with an opening to receive said shaft, an axially extending flange on said wall adjacent said opening driving gear means mounted on said shaft beyond said wall and adapted to pass through said opening with the shaft when the conveyer is assembled and disassembled, a bearing for said shaft, a supporting plate attached to said bearing and having a flange adapted to fit within said wall flange, and detachable means connecting said flanges together for securing said plate over said opening to cover the latter during operation, said plate being passable with said shaft and bearing through said opening during assembly and disassembly.

4. In a harvesting machine, a header platform, a feeder housing attached at one end thereof, said housing being open on the side adjacent the platform and having a wall on the outer side thereof, an auger conveyer extending across the platform and including a supporting shaft extending through said feeder house and beyond said outer side wall, the latter being provided with an opening to receive said shaft, driving gear means mounted on said shaft beyond said wall and adapted to pass through said opening with the shaft when the conveyer is assembled and disassembled, a bearing for said shaft, and detachable means for securing said bearing to said wall to position the bearing in said opening including a plate inside said end wall and overlapping the opening to close the latter.

5. In a harvesting machine, a header platform, a feeder housing attached at one end thereof, said housing being open on the side adjacent the platform and having a wall on the outer side thereof, an auger conveyer extending across the platform and including a supporting shaft extending through said feeder house and beyond said outer side wall, the latter being provided with an opening to receive said shaft, an axially extending flange on said wall adjacent said opening, driving gear means mounted on said shaft beyond said wall and adapted to pass through said opening with the shaft when the conveyer is assembled and disassembled, a bearing for said shaft, a supporting plate attached to said bearing, and having a flange adapted to fit within said wall flange and a plate fixed to said supporting plate and overlapping the opening inside said wall to form a closure therefor, and detachable means connecting said flanges together for securing said plate over said opening to cover the latter during operation, said supporting plate being passable with said shaft and bearing through said opening during assembly and disassembly.

HAROLD W. PILCHER.
ALVIN W. OEHLER.